United States Patent [19]

Lenaerts et al.

[11] 3,920,926

[45] Nov. 18, 1975

[54] TELEPHONE DATA SET INCLUDING VISUAL DISPLAY MEANS

[75] Inventors: George Victor Lenaerts; Eric Egils Auzins, both of London, Canada

[73] Assignee: Northern Electric Company Limited, Montreal, Canada

[22] Filed: Dec. 7, 1973

[21] Appl. No.: 422,816

[52] U.S. Cl. ....... 179/90 B; 179/90 AN; 179/2 CA; 340/365 E; 307/247 A; 235/156

[51] Int. Cl.$^2$ .......... H04M 1/44

[58] Field of Search .. 179/90 R, 90 K, 90 B, 90 BB, 179/2 DP, 2 CA, 90 AN; 340/365 R, 365 E, 324 AD; 235/152, 84 L; 307/247 A; 178/17 C

[56] References Cited

UNITED STATES PATENTS

| | | | |
|---|---|---|---|
| 3,601,552 | 8/1971 | Barnaby et al. | 179/90 B |
| 3,636,319 | 1/1972 | Nixon | 179/90 AN |
| 3,670,111 | 6/1972 | Bukosky et al. | 179/BD |
| 3,718,764 | 2/1973 | Deschenes et al. | 179/2 CA |
| 3,753,007 | 8/1973 | Viswanathan | 340/365 E |
| 3,760,121 | 9/1973 | Nissim | 179/90 K |
| 3,778,556 | 12/1973 | Mees et al. | 179/90 K |
| 3,787,639 | 1/1974 | Battrick | 179/90 K |
| 3,825,926 | 7/1974 | Brownback | 340/365 E |

*Primary Examiner*—Kathleen H. Claffy
*Assistant Examiner*—Gerald L. Brigance
*Attorney, Agent, or Firm*—Frank Turpin

[57] ABSTRACT

A conventional telephone set having a pushbutton pad is modified to include a memory system through which any information keyed on the pushbutton pad must pass before it is transmitted on the telephone line. The use of a memory allows the data stored therein to be viewed on a visual display and thus to be checked for accuracy prior to transmission. The set is also provided with an error correction facility whereby the last entry only or the entire contents of the memory may be erased and the correct data entered. The memory is of the non-destructive read-out type, thereby providing the telephone set with a redial capability. Also included in the set are a contact debounce circuit and a control circuit which causes the display to flicker on and off during the send cycle.

6 Claims, 6 Drawing Figures

TELEPHONE DATA SET INCLUDING VISUAL DISPLAY MEANS

This invention relates to a telephone set which may be used as a data transmitter as well as a conventional telephone.

In the past few years, the use of credit cards has proliferated to the extent that they may now be used in the completion of almost any business transaction. However, lost and counterfeit credit cards are a daily occurrence and the use of these illegal cards results in important losses to both customers and businessmen.

Lately the losses occurring from the illegal use of a credit card have been dampened to a great extent through the use of data terminals located on vendor's premises. When a customer attempts to use a credit card, the identification number of the card is entered into a data terminal which is connected to a central computer. The computer searches the records of the card in its memory and reports the status to the transmitting terminal. The vendor is then in a position to complete the transaction or to refuse the use of the credit card. In some systems, the business details of the transaction may be entered directly into the records of the central computer using the remote data terminal.

However, such remote data terminals tend to be fairly expensive. In addition, since they require a dedicated line to the central computer, they are normally associated with large businesses such as department stores.

Another type of credit verifying data terminal which is somewhat more flexible uses the telephone line as the transmission link between the remote data terminal and the central computer. Such a system is exemplified in U.S. Pat. No. 3,617,638. The system described in this patent comprises a conventional telephone subset to which is connected a data terminal. The data terminal comprises a mechanical credit card reader, an amount register settable with mechanical switches located on the data terminal housing and various switches and electronic circuits to control the operation of the data portion of the terminal. Such a system tends to be somewhat unreliable due to its mechanical apparatus. In addition, this type of data set is somewhat rigid in that the information to be transmitted is derived from a mechanical card reader and a mechanical amount register.

The problem associated with these hybrid data terminals may be overcome through the use of a fully electronic data terminal. The invention provides a data terminal which is fully electronic and which is integrated into a conventional telephone. The result is a versatile, flexible and economical telephone data set which, at the same time, provides improved conventional telephone service. Therefore, the invention provides the small businessmen such as service station operators, shop owners and the like with a transaction terminal which is practical and easy to use.

In accordance with the invention, a conventional telephone set is modified to include a memory system through which any information keyed on the pushbutton pad must pass before it is transmitted on the telephone line. The use of a memory allows the data stored therein to be viewed on a visual display and to be checked for accuracy prior to transmission. The set is provided with an error correction facility whereby the last entry or the entire contents of the memory may be erased and the correct data entered. The memory is of the non-destructive read-out type, thereby providing the telephone set with a redial capability. Since the data set portion of the telephone set uses electronic circuitry, it may be powered from the telephone line or from a separate power supply backed up with a battery pack capable of providing extended use of the data terminal in case of commercial power failure.

In order to obtain economy of power, reliability and full flexibility, a number of novel circuit techniques have been developed. For example, since the memory is fed directly from the pushbutton pad to a decoder circuit, contact bounce on the pushbutton keys becomes a problem. This problem has been circumvented by the use of a novel debounce and delay circuit which allows the data representing any digit to be written in memory only after a predetermined time interval subsequent to the occurrence of the last noise pulse generated by the switch contact of the corresponding pushbutton key. Also, the telephone set is provided with an error correct button which, when pressed once, causes the last entry into the memory to be erased, and when pressed twice, causes the entire contents of the memory to be erased.

The visual display for viewing the contents of the memory is time-shared. That is, only one numeral or unit of the display is energized at any instant, but each display unit is scanned at such a rate that the entire display appears to be illuminated all at once. This technique results in very economical use of power and circuitry. In addition, the visual display is turned off during the interval that a signal is being sent out on the telephone line and is energized in the interdigital period. This results in the entire display flickering while data is being sent out on the line, thereby providing the user with a visual indication that the data is being transmitted.

The set may also be provided with the option of a dial pulse sender which allows it to communicate with a central computer locatable through a central office equipped for rotary dial or to communicate directly with another subscriber located on such an office. With this option, the first set of data being sent after going off-hook simulates dial pulses and the second and subsequent transmissions use multifrequency signals.

An example embodiment of the invention will now be described in conjunction with the drawings in which:

FIG. 1 is a block diagram of a telephone data set in accordance with the invention;

FIGS. 2*a* and 2*b* together form a logic diagram of the telephone data set of FIG. 1;

FIG. 3, appearing out of order on page 1 of the drawings, shows pictorially how FIGS. 2*a* and 2*b* are to be collated in order to consider them as a single unified drawing; FIG. 4, also appearing out of order on page 1 of the drawings, is a block diagram of an embodiment of the send circuit shown in FIG. 1; and FIG. 5 is a block logic diagram of an alternate embodiment of the send circuit shown in FIG. 1.

FIG. 1 shows a pushbutton pad 1, a hybrid network 2, a handset 3, and a handset switch 4, all of which are found in a conventional TOUCH-TONE* or DIGITONE* telephone set. The pushbutton pad 1, which is essentially a 3×4 dual-contacts matrix with four horizontal rows of pushbutton keys and three vertical columns of pushbutton keys, presents seven appearances to a decoder 5 which translates the keyed information from the pad 1 into binary coded decimal information (BCD). A memory 6 accepts and stores the BCD information. The pad 1 provides keys for numerals 0 to 9, while the sextile or asterisk (*) key is decoded to provide a decimal point and the octothorp ( # ) key generates a command to send the contents of the memory unto the telephone line through a send circuit 7, a coupling circuit 8 and the hybrid network 2.

*Trademark

In the preferred embodiment of the invention, the send circuit 7 encodes the binary information into a 2 of 7 code consistent with a conventional multifrequency tone generator which generates tone signals for transmission on the telephone line. An alternate embodiment of the send circuit provides a dial pulse sender circuit whereby the first set of data which is sent after going off-hook is translated and sent as dial pulses whereas the second and subsequent sets of data are decoded and transmitted as multifrequency signals. The coupling circuit 8 essentially comprises a transformer connected into the hybrid network 2 as the same location that a tone generator would normally be connected.

The contents of the memory 6 may be viewed on a visual display 9. The operation of the telephone data set is controlled by control circuits 10 which have inputs from the decoder 5, the handset switch 4 and an error correct key 11.

OPERATION OF THE CIRCUIT (FIG. 1)

The entire operation of the telephone data set is controlled by the keys on the pushbutton pad 1, the error correct key 11 and the handset switch 4. In this embodiment, the handset 3 is powered conventionally from the telephone line and the electronic circuitry is powered from a separate power supply (not shown). The set is powered at all times so that the called number may be entered with the handset on-hook.

To make a call, the called number is keyed into the memory with the handset on or off-hook and the keyed digits are displayed on the visual display 9. To send the called number, the handset is lifted off-hook and the key is pressed. While the data is being sent, the display blinks and is turned off at the end of the send cycle. The display blinks during the send cycle because it is disabled while a tone is generated on the telephone line and enabled in the interdigital period. If the call is to another person, the telephone set functions in the conventional manner and if the call is to a computer, a signal to enter more data is received. This signal may be a voice response or a tone signal which is received through the headset 3 or which may be used to activate a visual indicator (not shown). The calling party then enters more data and the sequence is repeated.

Even though the display is turned off at the end of a send cycle, the memory is not erased and the called number is still stored therein. Therefore, if the called number is busy, a second attempt at completing a call simply entails pressing the hook switch and then the # key.

As data is entered into the memory 6, it also appears on the visual display 9. If an error is detected, the error correct key 11 may be pressed once to erase the last entry and pressed twice to erase the entire contents of the memory.

DETAILED DESCRIPTION OF THE PREFERRED EMBODIMENT

Figure 1:
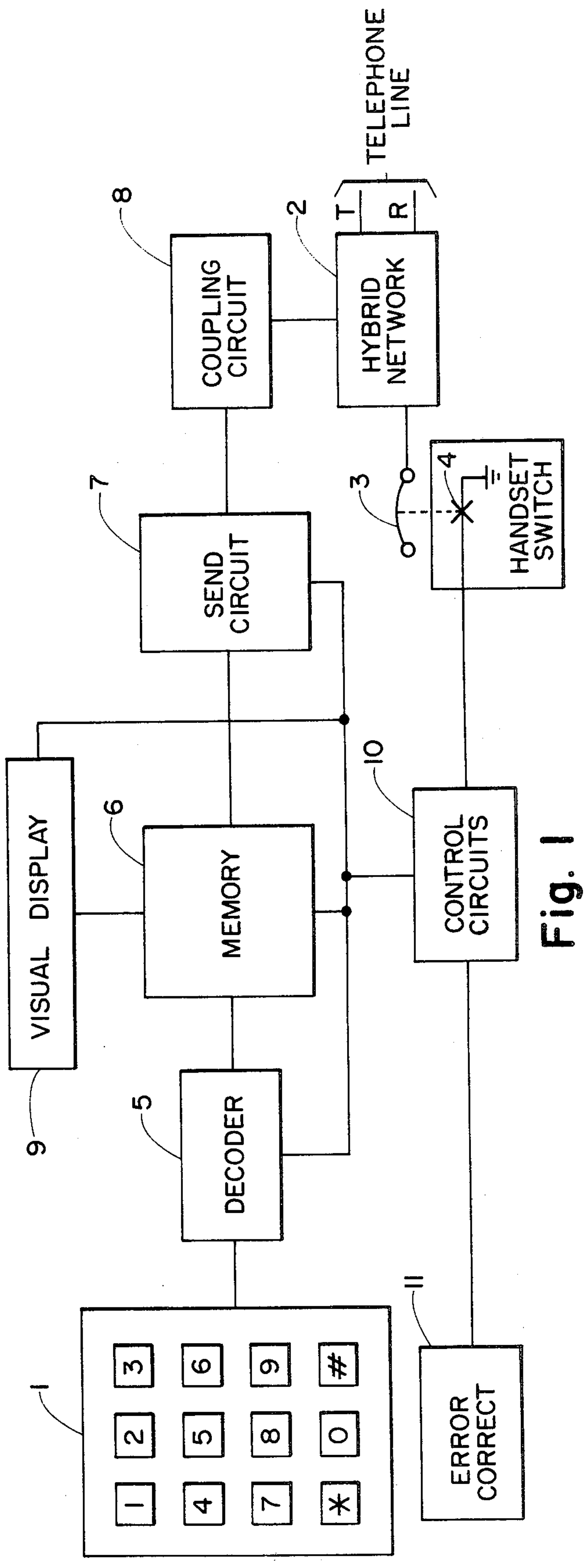

The operation of this telephone data set will become clearer with the following description of FIGS. **2*a* and 2*b* which show a logic diagram of the telephone data set shown in FIG. 1**.

There is shown a pushbutton pad 20, a decoder 21 and a memory 22. The pad 20 is a 3×4 key matrix wherein the operation of any key causes the operation of two contacts, one of which serves as an input to the decoder 21, and the other as a make switch to ground. The second contacts of every key are connected together and provide a signal (CS) to the control circuitry every time one of the keys is operated.

The decoder 21 translates the information keyed on the pad 20 into corresponding binary coded decimal (BCD) signals which appear at the input of the memory 22. The decoder 21 also provides a fifth output lead for carrying the signal ( $\overline{\#}$ ) of the send command to the control circuitry. The output of the decoder 21 may be inhibited by applying a signal ($\overline{CMS}$) on input terminal A.

The memory 22 is of a random access type in that one can write or read at any time. To read out of the memory, the address code is provided at the address input and whatever is located at that address will appear at the output leads. Similarly, to write into the memory at any one address, a signal is generated on input lead MWS by a memory write strobe circuit 23. Also, a "one" signal on the CE input lead will cause a high signal to appear on the output leads for the duration of the signal on the CE lead. Because the decimal zero is a valid number in telephone signalling, the clearing of memory signifies that it contains all "1"s. Since most credit cards are coded with a maximum of 16 digits, the memory provides storage for 16 BCD words. The addresses of the memory for writing and sending are generated by a memory address generator 24 whose output is gated through an address selection circuit 25. Similarly, the addresses of the memory for viewing the contents of the memory on a visual display are generated by a display address generator 26 whose output is also gated through selection circuit 25. The address selection circuit may simply be an AND-OR circuit and is controlled by an address transfer pulse $\overline{AT}$ which is high for writing into the memory and for sending data on the telephone line. This signal is gated by inverter 27 whose output controls the access of the display address generator output signals to the memory address input. When the $\overline{AT}$ signal is low, the display address generator output is selected and when at $\overline{AT}$ signal is high, the memory address generator output is selected.

Positive logic is used throughout the circuitry. Therefore, a positive signal is called "1" or "high" and a ground signal is called "0" or "low".

The clock circuit 28 is basically an oscillator providing a 16 KHz signal on output lead CK1 and a 500 Hz signal on CK2.

The visual display 9 of FIG. 1 comprises a binary to segment decoder 29, lamp drivers 30, a binary to display position decoder 31, the display address generator 26 and lamps 32. Each of lamps 32 comprises an 8 segment light-emitting diode — seven segments for displaying numerals 0 to 9 and one segment for displaying a decimal point. The display address generator 26 produces sequentially ascending memory addresses which are applied to the memory 22 and to the decoder 31.

For any one address, the BCD information at the output of the memory is translated by decoder 29 which energizes one or more of leads *a* to *h* which correspond to the segments of any one lamp. At the same time, the decoder 31 translates the output from the display address generator 26 into one of 16 positions, each position corresponding to one of lamps 32. Therefore, at any instant in time, only one lamp is illuminated but since the display address generator is driven by the 16 KHz clock signal from the clock circuit 28, the entire group of lamps 32 appears illuminated at the same time. This time-sharing arrangement represents important economy of power and of drive circuits required, as well as cutting down drastically on the total number of leads required to the display board itself. The entire display may be disabled by applying a signal (DD) to the D input of the decoder 31. This signal inhibits the output of the decoder 31 and effectively shuts off the display.

A reset circuit 33 is used to generate a reset pulse ($\overline{RP}$) when the handset is lifted off-hook. A quick reset pulse is generated to ensure that all flip-flops are reset before the set is used.

A delay circuit and strobe pulse generator 34 generates a data strobe (DS) pulse which is used to control all the functions of the telephone data set. This data strobe pulse is generated only after a predetermined time interval subsequent to the occurrence of the last noise pulse generated by the switch contacts of the key which caused the generation of the pulse. This circuit therefore eliminates the problems that contact chatter of the pushbutton pad keys or the error correct key 35 may cause.

The delay circuit and strobe pulse generator 34 comprises a two-stage counter circuit made up of J-K flip-flops 340 and 341 and driven from the CK2 output (500 Hz) of the clock circuit 28. The J-inputs of these flip-flops is connected to the "0" output of an RS flip-flop 342. The Q-outputs of FF 340 and 341 are gated through a gate 343 and inverter 344. The command inputs from the error correct key 35 and the pad 20 are connected to circuit 34 through a gate 345.

With none of the keys operated, the output of gate 345 is low and maintains flip-flops 340, 341 and 342 in their reset state. When the error correct key 35 or any key on pad 20 is operated, the counter is allowed to count the clock signals at the clock input of FF 340. If a contact bounce occurs at any time during the count, the gate 345 goes to ground and resets the counter. After the last contact bounce, the counter is again allowed to count. At the count of three, gate 343 switches and sets FF 342. On the next clock input, the counter steps to state "0" and stays in that condition as long as the key is held operated. The net result is that a single two millisecond wide pulse is generated after the occurrence of the last contact bounce. This pulse (DS) is gated through inverter gate 344 to generate function strobe pulses.

A numeral or sextile strobe pulse $\overline{N*S}$ is generated at the output of gate 36 when a DS pulse exists and it is not the result of pressing the error correct key 35 or the # key on pad 20. This $\overline{N*S}$ pulse controls the writing of data into the memory 22.

An error correct strobe pulse $\overline{ECS}$ is generated at the output of gate 37 when the DS pulse exists as a result of the operation of the error correct key 35. This $\overline{ECS}$ pulse controls the sequence for the correction of data entered into the memory 22.

A send start strobe pulse $\overline{SSS}$ is generated at the output of gate 38 when a DS pulse exists, the # key on pad 20 is operated and the handset switch 4, which is operated by the handset 3 of FIG. 1 is operated (handset is off-hook). This $\overline{SSS}$ pulse initiates the sending of data from the memory 22 onto the telephone line.

The remainder of the control circuitry is a logical arrangement of conventional circuit components. The specific use of these gates and flip-flops will be clearer when the control circuits are described in detail.

Figure 4:
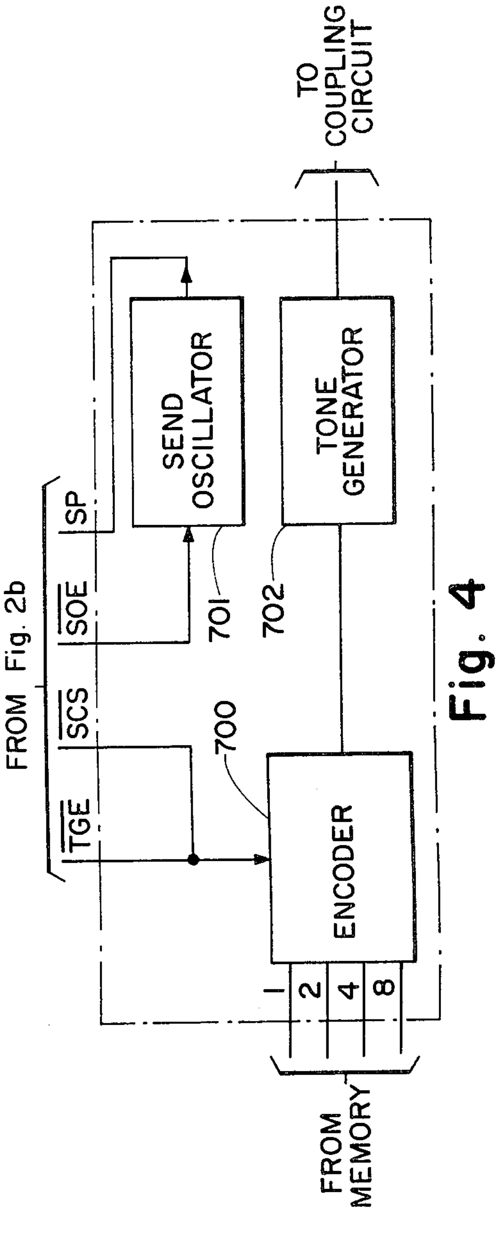
Figure 3:
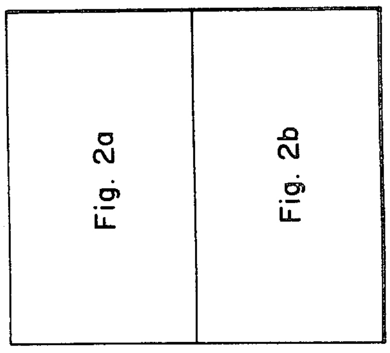
Figure 2A:
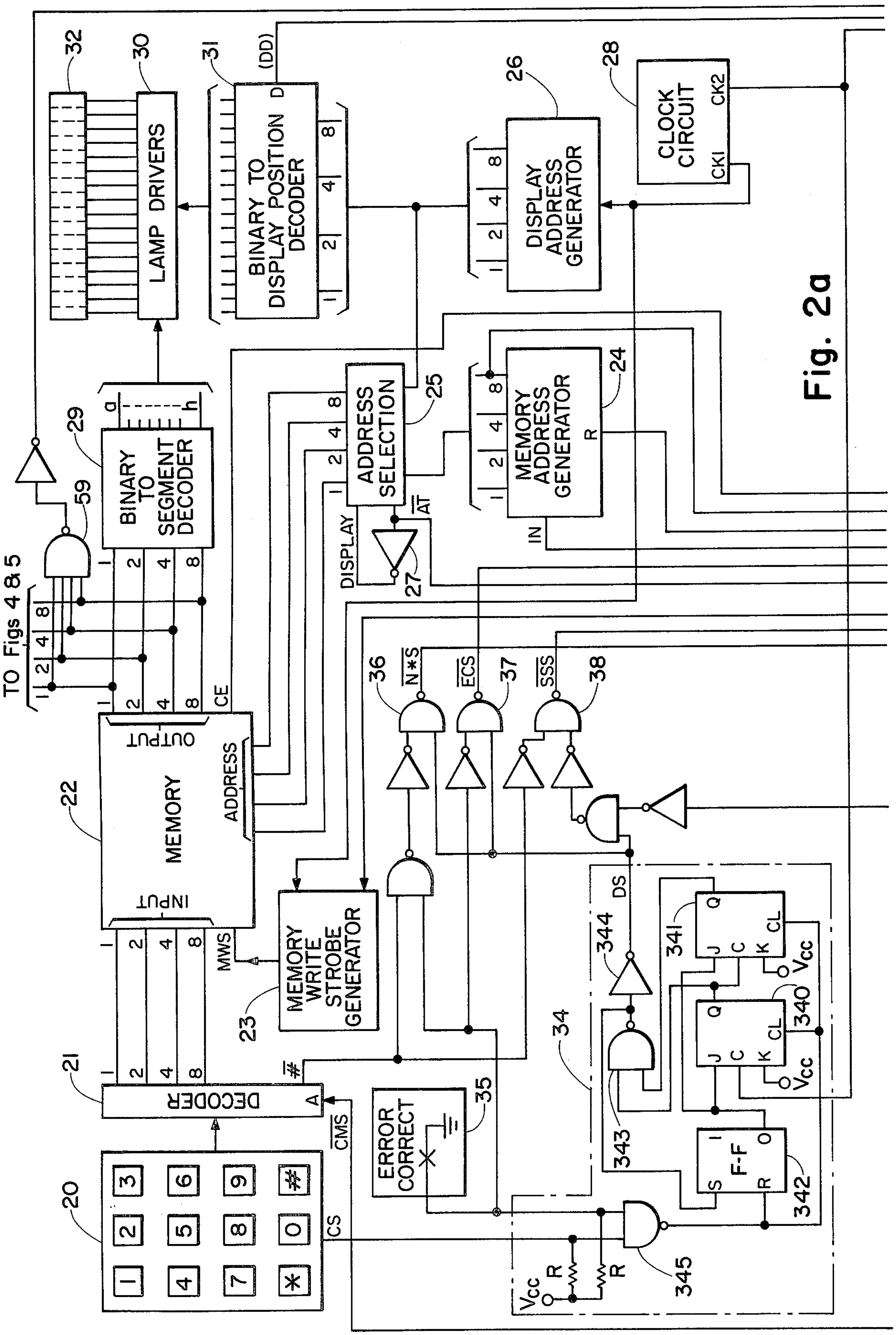
Figure 2B:
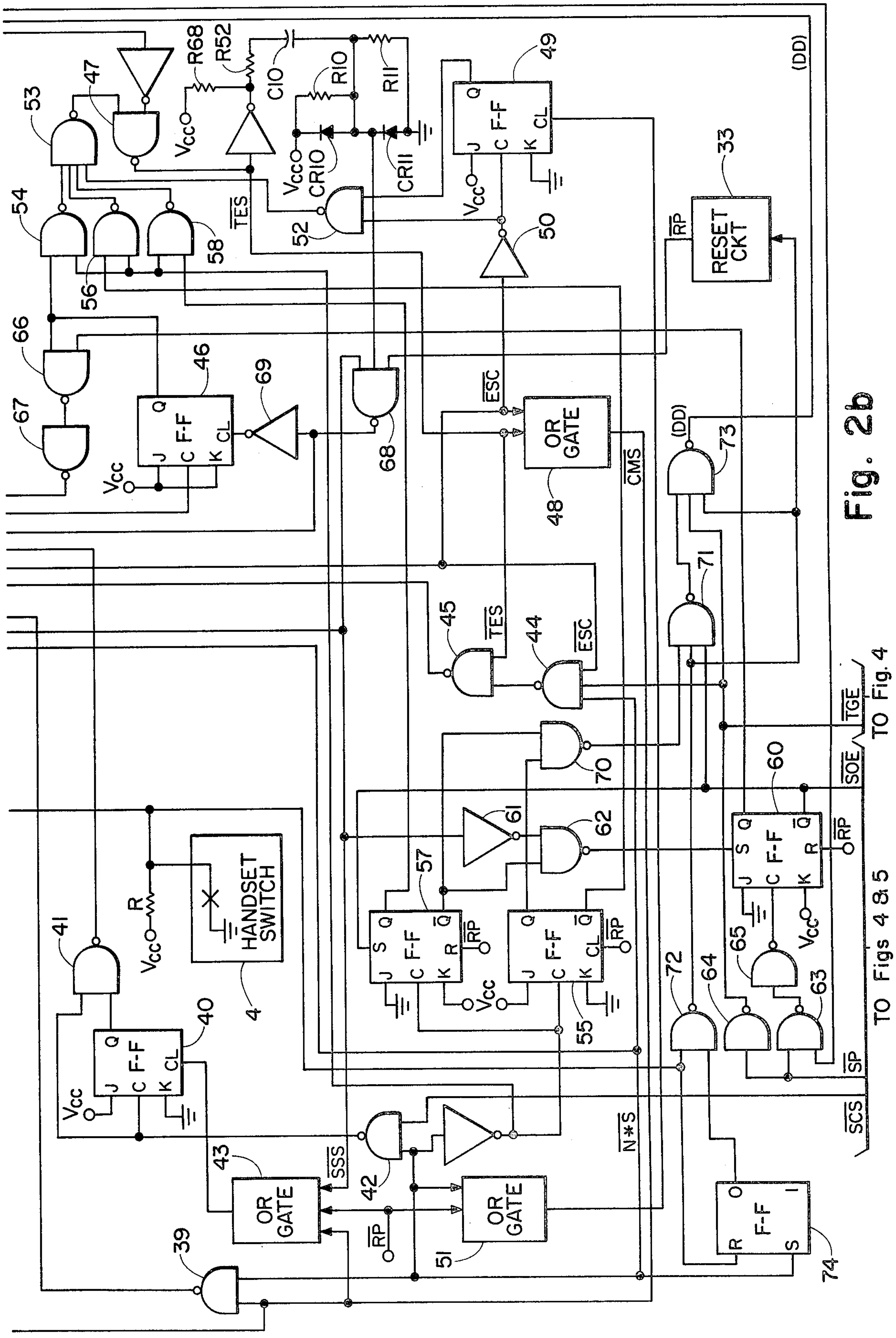

As mentioned above, one embodiment of the send circuit 7 of FIG. 1 receives the BCD data from the memory and generates corresponding multifrequency signals on the telephone line. This embodiment is shown in FIG. 4 and comprises and encoder 700, a send oscillator 701, and a tone generator 702. The encoder 700 translates the BCD information from the memory into 2 of 7 data thereby simulating the information normally obtained from a DIGITONE or TOUCH-TONE pad. A send oscillator 701 is a square-wave oscillator whose output determines the operation of the tone generator 702 which is a conventional multifrequency tone generator employed in telephone signalling. On reception of a send oscillator enable ($\overline{SOE}$) signal derived from the $\overline{SSS}$ pulse, the send oscillator 701 generates send pulses from which the control circuits of FIGS. **2*a* and 2*b* derive a tone generator enable ($\overline{TGE}$) signal for controlling the operation of the encoder 700 which controls the operation of the tone generator 702** in a conventional manner.

Figure 5:
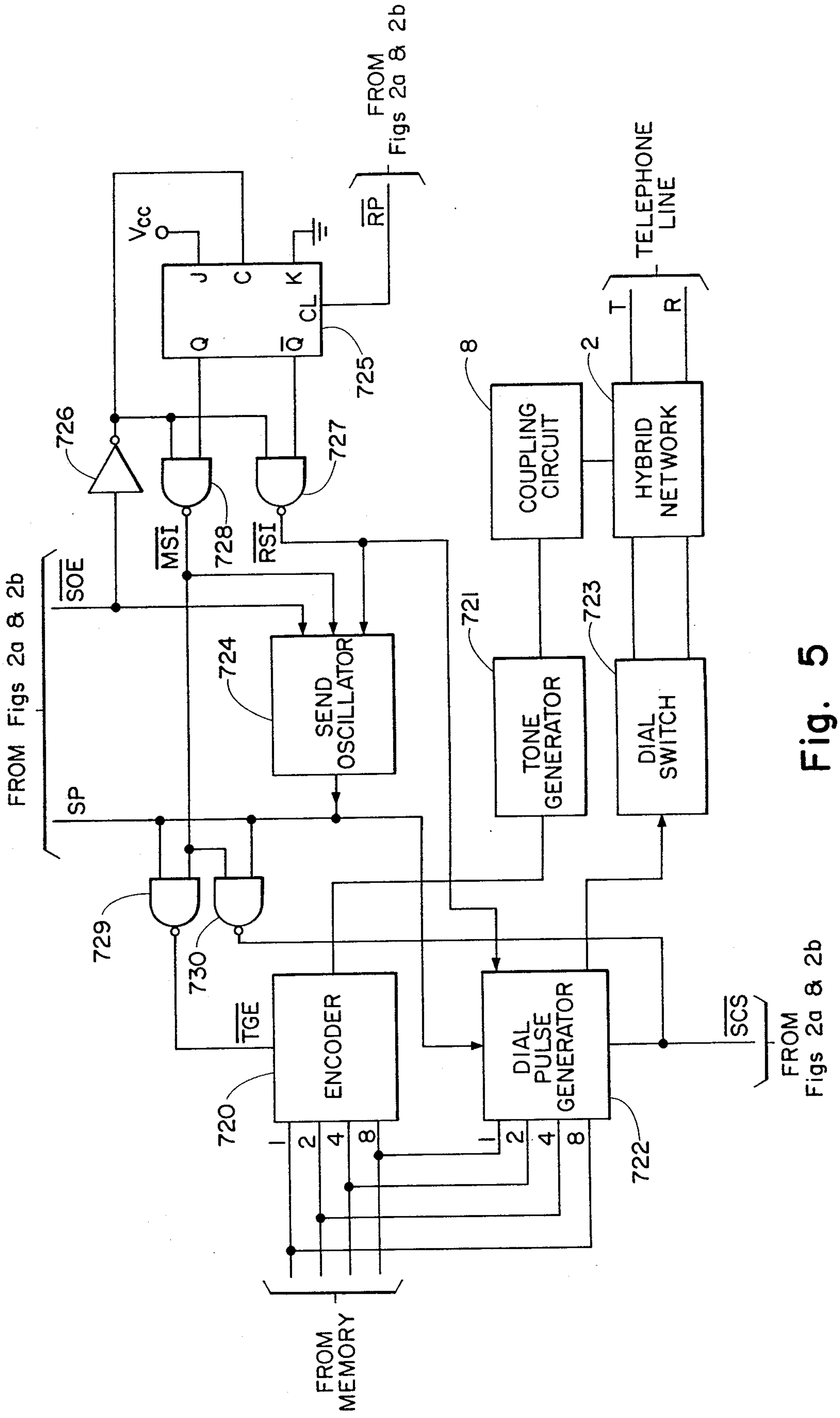

The second embodiment of the send circuit 7 of FIG. 1 is shown in FIG. 5. The BCD data leads from the memory are connected to an encoder 720 which translates the BCD data into 2 of 7 information compatible with a conventional tone generator 721 which is connected to the telephone line via the coupling circuit 8 and the hybrid network 2. A dial pulse generator 722 is also connected to the BCD data leads from the memory. The generator 722 translates the BCD data into dial pulses which control a dial switch 723 which breaks the direct current loop of the telephone line thereby emulating the operation of a rotary dial.

The send oscillator 724 is a square wave oscillator whose output pulse width is variable. When it is desired to send multifrequency signals, the output signal of the oscillator is made to be approximately symmetrical and when it is desired to send dial pulses its output signal has the ratio of dial pulses, that is, approximately 62 milliseconds high and 38 milliseconds low. This may be achieved by switching portions of the charging circuit of the oscillator 724.

The operation of this send circuit is controlled by a J-K flip-flop 725 which is essentially a one stage counter, and gates 726, 727, 728, 729 and 730. When the handset is lifted off-hook, the FF 725 is reset and its $\overline{Q}$ output is high. The gating of the send oscillator enable $\overline{SOE}$ signal through gates 726 and 727 generates a rotary send instruction ($\overline{RSI}$) signal which enables the dial pulse generator 722 and modifies the send oscillator 724 charging circuit for the generation of dial pulses. The $\overline{SOE}$ signal also enables the send oscillator 724 to generate send pulses. The dial pulse generator 722 generates a send character strobe $\overline{SCS}$ pulse which is the same width as the time it takes to send out all the dial pulses for a given character. The $\overline{SCS}$ signal is used to advance the memory address generator 24 of FIG. 1.

At the completion of the rotary mode transmission, the $\overline{SOE}$ signal goes high and through gate 726 sets FF

725. Because the J-input of FF 725 is held high and the K-input is held low, the flip-flop cannot flip back due to further signals at its clock input. Thus any number of further SOE signals will not cause a rotary mode transmission again until the handset has been set on-hook.

With Ff 725 set, its Q output is high. The gating of the next $\overline{SOE}$ signal through gates 726 and 728 generates a multifrequency signal instruction $\overline{MSI}$ which modifies the send FF 724 charging circuit for the generation of multifrequency signals. The $\overline{SOE}$ signal enables the send oscillator 724 which generates send pulses which, gated through gate 729 enable the encoder 720 and which, gated through gate 730 generate send character strobe $\overline{SCS}$ pulses. Each of these strobe pulses is the same width as the tone that is being sent out and serves to advance the memory address generator 24 of FIG. 1.

DETAILED DESCRIPTION OF CONTROL CIRCUITS

The previous description of operation related to what functions the telephone data set is capable of performing whereas the following description relates to how these functions are obtained.

ENTERING DATA INTO MEMORY

When any of the numeral keys or the * key on pushbutton pad 20 is pressed, the decoder 21 translates the information from the key into BCD data which appears at the input of the memory 22. At the same time, the common switch contact of the key causes a $\overline{N*S}$ strobe pulse as described earlier. This pulse is fed through gate 39 and causes the memory write strobe generator 23 to enter the data into the memory 22.

The memory address generator 24 is a counter which is advanced on the leading edge of the $\overline{N*S}$ pulse. However, when the generator 24 has been reset its output signal represents the first address in memory; therefore, after resetting of the generator 24, the first advance pulse must be eliminated so that the first entry will be entered at the first address of the memory. The function of eliminating the first pulse to the generator 24 is performed by flip-flop 40 and gate 41. When a $\overline{N*S}$ pulse is fed through gate 42, it cannot pass through gate 41 to the generator 24 until after the occurrence of the trailing edge of the input pulse at which time flip-flop 40 is set. The leading edge of the second and subsequent input strobe pulses will reach the generator 24 through gate 41 and will step it ahead to change the address to the memory. The flip-flop 40 is reset through gate 43 whenever a RP pulse (going off-hook) or a send start strobe (SSS) pulse or an erase cycle occurs.

During the write cycle, the $\overline{N*S}$ pulse through gates 44 and 45 generates an address transfer pulse $\overline{AT}$ which causes the address selection circuit 25 to select the output of the memory address generator 24 for the duration of the $\overline{N*S}$ pulse.

The memory address generator 24 is only capable of generating sixteen addresses; however, at the completion of the sixteenth entry, flip-flop 46 is set to provide a seventeenth count. The function of this flip-flop will become evident in the following description.

ERASE FUNCTIONS

Erasing the contents of the memory 22 is achieved by writing all "ones" into it. For a single entry erase, a one is written in at the same address location as the previous data entry.

A total erase is initiated when the error correct key 35 is pressed twice or the seventeenth entry is not a send command ( # key) or a numeral or * key is pressed next after a send cycle has been completed or when a numeral or * key is pressed next after a reset pulse ($\overline{RP}$). Under any one of the above conditions, a total erase strobe ($\overline{TES}$) pulse is generated at the output of gate 47. This is a one millisecond wide pulse during which the total erase function is done. The $\overline{TES}$ pulse through gate 45 prevents the address selection circuit 25 from selecting the output of the memory address generator 24. Instead, the output of the display address generator 26 (which is driven by the 16 KHz output of clock circuit 28) is selected. The $\overline{TES}$ pulse through gate 48 forces the decoder 21 to generate all "ones," and enables the memory-write strobe generator 23 through gate 39. Therefore, all ones are written at all 16 addresses of the memory.

ERROR CORRECTION

As described previously, the errory correct strobe $\overline{ECS}$ is generated at the output of gate 37 when the error correct key 35 is pressed. This signal initiates an address transfer signal $\overline{AT}$ through gates 44 and 45 and a $\overline{CMS}$ signal through gate 48. Because the memory address generator is not advanced, the memory is effectively cleared at the last address where data was last entered. At the same time, the $\overline{ECS}$ pulse sets flip-flop 49 through gate 50. If a $\overline{N*S}$ pulse is generated next, flip-flop 49 is cleared through gate 51.

However, if the error correct key 35 is pressed twice consecutively a second $\overline{ECS}$ signal is generated. This signal is now allowed to pass through gates 52 and 53 and causes a $\overline{TES}$ signal to be generated at the output of gate 47.

A total erase strobe signal is also generated when a seventeenth entry is a numeral or * (not a send command). At this time, the Q output of flip-flop 46 is high so that when the $\overline{N*S}$ is generated, gates 54, 53 and 47 generate a $\overline{TES}$ signal.

The reset pulse $\overline{RP}$ generated on going off-hook resets flip-flop 55 whose $\overline{Q}$ output is connected to gate 56. When a $\overline{N*S}$ pulse is generated, a $\overline{TES}$ signal is generated by gates 56, 53 and 47. Therefore, a total erase signal occurs when a numeral or * key is pressed next after going off-hook. On the trailing edge of the first $\overline{N*S}$ pulse, flip-flop 55 is set thereby disabling gate 56. Subsequent generation of $\overline{N*S}$ pulses will not cause a total erase cycle through this path. This control feature ensures that the old data is held in the memory right up until the time that the first numeral or * key is pressed thereby providing the recall feature.

When a send cycle is generated (described below) the send oscillator enable signal $\overline{SOE}$ sets flip-flop 57 whose Q output is connected to gate 58. When a $\overline{N*S}$ pulse is generated, a $\overline{TES}$ signal is generated by gates 58, 53 and 47. Therefore, a total erase signal occurs when a numeral or * key is pressed next after a send cycle. Flip-flop 57 is reset on the trailing edge of the $\overline{N*S}$ pulse.

In the erasure modes just described, total erasure occurs during the first millisecond and the new data is entered during the second millisecond. To ensure that the digit counter is reset quickly before the data entry cycle starts during the second millisecond, a trigger circuit comprising C10, R10, R11, CR10 and CR11 is used to reset the memory address register 24 and flip-flop 46 on the trailing edge of the total erasure strobe pulse just before the new data is entered.

SEND CONTROL CIRCUITRY

As described earlier, a send cycle is initiated by the pressing of the # key on the pushbutton pad 20. The data which is transmitted on the telephone line comprises whatever data is contained in the memory when the # key is pressed followed by the tone representing that key.

The output leads of the memory 22 are connected to a gate 59 which decodes the data representing the # key. The binary code in memory for the # tone is defined to be all "ones."

When the # key is pressed, the send start strobe $\overline{SSS}$ pulse is generated and sets flip-flop 60 through gates 61 and 62. The $\overline{Q}$ output of flip-flop 60 is defined as the send oscillator enable ($\overline{SOE}$) signal and it enables the send circuitry as described previously. The send pulses (SP) from the send circuitry are applied to gates 63 and 64 whereas the send character strobe pulses ($\overline{SCS}$) are applied to gate 42 to advance by one step the address of the memory address generator 24 every time a digit is sent out. Whenever a gate 59 detects the # code in the memory, the flip-flop 60 is reset through gates 63 and 65 at the end of the corresponding send pulse thereby disabling the send circuitry and thus completing a send cycle.

Whenever the memory 22 contains sixteen digits, a seventeenth digit consisting of the # tone is also transmitted on the telephone line. After the sixteenth digit is sent, the seventeenth step counter flip-flop 46 is set. The signal on its Q output along with the signal on the Q output of FF 60 through gates 66 and 67 force the memory output to be all "ones" thereby causing the tone to be generated. At the end of this tone, FF 60 is reset as described above, whereas FF 46 is reset through gates 68 and 69 whenever a $\overline{SSS}$ pulse or a reset pulse $\overline{RP}$ is generated.

When the flip-flop 60 is set at the beginning of the send cycle, the $\overline{SOE}$ signal also sets flip-flop 57 whose $\overline{Q}$ output prevents any further $\overline{SSS}$ pulses from passing through gate 62. This control feature allows a second transmission of the same data only after going on hook after the first transmission.

DISPLAY CONTROL CIRCUITS

The display circuitry is energized and presents a view of the memory contents any time the handset is off-hook except when (i) no data entry on-hook or off-hook has occurred, (ii) a send cycle is completed, (iii) a tone is being sent out during a send cycle, or (iv) during the break portion of a dial pulse when the send circuit is functioning in the dial pulse mode. The display is also energized when the handset is on-hook and data entry is taking place.

As described above, the entire display may be disabled by applying a display disable (DD) signal to the D input of the binary to display position decoder 31.

If the handset is lifted without having entered any data on-hook then a reset pulse ($\overline{RP}$) is generated and resets flip-flop 55. The Q output of FF 55 is low and is connected to the input of gate 70 which has its output connected to one of the three inputs of gate 71. The second input, the send oscillator enable ($\overline{SOE}$) signal, is high because nothing has yet been sent. The third input is high because one input of gate 72 is low due to the hookswitch contact being closed. Thus the output of gate 71 is low and causes gate 73 to generate the display disable signal (DD).

At this point, one has the choice of sending what is in the memory by pressing the # key or entering data into memory by pressing a numeral key. If a numeral or * key is pressed, flip-flop 55 flips. Total erase occurs and the new data is entered at the first address. Because flip-flop 55 has flipped, the input to gate 70 is now high causing the output of gate 71 to be high and the display disable (DD) signal to be low. This enables the decoder 31 to start scanning, thus indicating what the first entry has been.

If the # key has been pressed first, flip-flop 55 would not have flipped but the send oscillator enable ($\overline{SOE}$) signal which is connected to the input of gate 71 causes the display disable signal to be low during the send cycle. Now the display is capable of flickering during the recall send mode.

When the send cycle is completed, the display is disabled even though the memory still holds the data and could be used again in the recall mode. Flip-flop 57 is set by the send oscillator enable ($\overline{SOE}$) signal during the send cycle and remains set until the next press of a numeral or * key. The $\overline{Q}$ output of flip-flop 57 is low which causes a low at the output of gate 71 thereby generating a display disable signal at the output of gate 73.

During the portion of a send cycle that a tone is being generated, the output of the memory address generator 24 remains stationary. Therefore, if the display was allowed to scan at this time, all the digits in the display would read only the number of the characters being sent and, between tones, the display would revert back to normal. The display is therefore disabled during the time the tone is going out by applying the tone generator enable ($\overline{TGE}$) signal to the input of gate 73.

When the handset is placed on-hook, both inputs to gate 72 are high and its low output goes to one input of gate 73 thereby generating the display disable signal thereby disabling the decoder 31.

The telephone data set is energized at all times and thus provides the on-hook data entry capability. When a numeral or * key is pressed, the $\overline{N*S}$ signal is generated and sets flip-flop 74 the output of which goes low and causes the output of gate 72 to go high. This in turn causes the display circuits to operate normally as well as causing a reset pulse ($\overline{RP}$) to be generated by the reset circuit 40. When the handset is lifted off-hook, the flip-flop 74 is reset due to the line switch and its output goes high. However, the display is maintained energized because the second input of gate 72 is connected to ground through the line switch.

As may be surmised from the above description, the invention provides a telephone data subset which is completely controlled from a standard pushbutton pad and an error correct key. The ease of operation of the set indicates that it may be used by people who do not require special training beyond following a few basic rules. In addition, the set provides improved conventional telephone service in the form of a redial capability.

What is claimed is:

1. A telephone data set comprising:

a conventional telephone set having a pushbutton pad, a handset, and circuit means for connecting the set to a telephone line;

memory means for storing binary signals corresponding to the signals from the pushbutton pad;

a send circuit connected to said memory means for generating telephone signalling signals corresponding to the contents of the memory means;

an error correct key;

a logic control circuit for allowing the memory means to store a plurality of signals generated by the pushbutton pad, said control circuit being responsive to the signal from one of the keys on the pushbutton pad for causing the signals stored in the memory means to be fed sequentially to the send circuit and hence unto the telephone line; said logic control circuit including error circuit means responsive to a first momentary actuation of the error key to erase from the memory means the data corresponding to the last-entered digit.

2. A telephone data set as defined in claim 1 wherein said error circuit means is responsive to a second consecutive momentary actuation of the error key to clear the memory means.

3. In a telephone data set comprising a conventional telephone set having a plurality of keys and a memory means for storing binary signals corresponding to the signals from the keys, a control debounce circuit means for allowing the data representing any one of said keys to be written into the memory means only after a predetermined time interval subsequent to the occurrence of the last noise pulse generated by the switch contacts of that key, said contact debounce circuit means comprising:

a counter circuit adapted to be connected to a source of clock signals;

first means for controlling the operation of the counter circuit including a first gating means for resetting it when none of the keys is actuated and for allowing it to count when at least one key is being actuated, and for resetting it whenever a contact bounce occurs;

second gating means for decoding a predetermined count of the counter, thereby providing an output signal a predetermined amount of time after the last contact bounce; and second means responsive to said output signal for inhibiting the operation of the counter circuit, for resetting it and maintaining it in the reset state until the release of the key which initiated the count.

4. A telephone data set comprising:

a conventional telephone set having a pushbutton pad and circuit means for connecting the set to a telephone line;

memory means for storing binary signals corresponding to the signals from the pushbutton pad;

a send circuit connected to said memory means for generating telephone signalling signals corresponding to the contents of the memory means;

a visual display for viewing the contents of the memory means;

a logic control circuit for allowing the memory means to store a plurality of signals generated by the pushbutton pad, said logic control circuit including display control means for causing said visual display to be enabled and disabled in synchronism with said telephone signalling signals whereby the visual display is caused to flicker during the send cycle.

5. In a telephone data set comprising a conventional telephone set having a pushbutton pad and circuit means for connecting the set to a telephone line, memory means for storing binary signals corresponding to the signals from the pushbutton pad, a send circuit connected to said memory means for generating telephone signalling signals corresponding to the contents of the memory means, said signalling signals comprising a plurality of tones or pulses each one of which is separated from an adjacent one by a predetermined time interval; a visual display for viewing the contents of the memory means; a method for controlling said visual display comprising the steps of:

a. disabling the visual display during the time that each of said tones or pulses is being sent on the telephone line; and b. enabling the visual display during each of said predetermined time intervals, thereby causing the visual display to flicker during the send cycle.

6. A telephone data set comprising, a conventional telephone set having a pushbutton pad, memory means for storing binary signals corresponding to the signals from the pushbutton pad, a visual display for viewing the contents of the memory means, a logic control circuit for allowing the memory means to store a plurality of signals generated by the pushbutton pad, said logic control circuit including display control means comprising:

a. second circuit means for enabling the display with the handset off-hook only when data has been entered into the memory means since the handset was last on-hook;

b. third circuit means for enabling the visual display with the handset on-hook when data has been entered into the memory means since the handset was placed on-hook;

c. fourth circuit means for disabling the visual display at the end of a send cycle with the handset off-hook.

* * * * *